United States Patent
Chauvel

(10) Patent No.: US 7,506,131 B2
(45) Date of Patent: Mar. 17, 2009

(54) REFORMAT LOGIC TO TRANSLATE BETWEEN A VIRTUAL ADDRESS AND A COMPRESSED PHYSICAL ADDRESS

(75) Inventor: Gerard Chauvel, Antibes (FR)

(73) Assignee: Texas Instruments Incorporated, Dallas, TX (US)

(*) Notice: Subject to any disclaimer, the term of this patent is extended or adjusted under 35 U.S.C. 154(b) by 820 days.

(21) Appl. No.: 10/632,215

(22) Filed: Jul. 31, 2003

(65) Prior Publication Data

US 2004/0162954 A1 Aug. 19, 2004

Related U.S. Application Data

(60) Provisional application No. 60/400,391, filed on Jul. 31, 2002.

(30) Foreign Application Priority Data

Jul. 30, 2003 (EP) .................................. 03291921

(51) Int. Cl.
*G06F 9/302* (2006.01)
*G06F 9/305* (2006.01)

(52) U.S. Cl. ..................................... 711/202
(58) Field of Classification Search .................. 711/202
See application file for complete search history.

(56) References Cited

U.S. PATENT DOCUMENTS

| | | | |
|---|---|---|---|
| 5,261,077 A | 11/1993 | Duval et al. | |
| 5,680,161 A * | 10/1997 | Lehman et al. | 345/531 |
| 6,070,173 A * | 5/2000 | Huber et al. | 707/206 |
| 6,098,089 A | 8/2000 | O'Connor et al. | 709/104 |
| 6,237,069 B1 | 5/2001 | Fan | |
| 6,317,817 B1 | 11/2001 | Shichiku et al. | |
| 6,452,601 B1 | 9/2002 | Marino et al. | |
| 6,567,905 B2 | 5/2003 | Otis | 711/170 |
| 6,571,260 B1 | 5/2003 | Morris | 707/206 |
| 7,206,924 B2 * | 4/2007 | Boles et al. | 712/220 |
| 7,210,008 B2 * | 4/2007 | Chandra et al. | 711/154 |
| 2002/0065990 A1 | 5/2002 | Chauvel et al. | 711/137 |
| 2002/0069332 A1 | 6/2002 | Chauvel et al. | 711/144 |
| 2003/0101320 A1 | 5/2003 | Chauvel et al. | 711/154 |

OTHER PUBLICATIONS

"Data Width and Format Conversion Subsystem for a Graphics Coprocessor", IBM Technical Disclosure Bulletin, IBM Corporation, New York, U.S., vol. 33, No. 3A, Aug. 1990, pp. 145-152, XP000123881, ISSN: 0018-8689.
*Embedded JAVA*, Vincent Perrier, Aug. 15, 2001, (3 p.); Online http://www.onjava.com/pub/a/onjava/synd/2001/08/15/embedded.html.

* cited by examiner

*Primary Examiner*—Kevin Ellis
*Assistant Examiner*—Hamdy S Ahmed
(74) *Attorney, Agent, or Firm*—Ronald O. Neerings; Wade James Brady, III; Frederick J. Telecky, Jr.

(57) ABSTRACT

In some embodiments, reformat logic comprises a plurality of registers and translation logic that accesses the registers. The translation logic receives a memory access targeting an application data structure that has a different format than accesses permitted to be provided to a device, which may be a display. The translation logic reformats the request to a format compatible with the device based on values stored in the registers.

26 Claims, 9 Drawing Sheets

REFORMAT LOGIC TO TRANSLATE BETWEEN A VIRTUAL ADDRESS AND A COMPRESSED PHYSICAL ADDRESS

CROSS-REFERENCE TO RELATED APPLICATIONS

This application claims priority to U.S. Provisional Application Ser. No. 60/400,391 titled "JSM Protection," filed Jul. 31, 2002, incorporated herein by reference. This application also claims priority to EPO Application No. 03291921.9, filed Jul. 30, 2003 and entitled "Reformat Logic To Translate Between A Virtual Address And A Compressed Physical Address," incorporated herein by reference. This application also may contain subject matter that may relate to the following commonly assigned co-pending applications incorporated herein by reference: "System And Method To Automatically Stack And Unstack Java Local Variables," Ser. No. 10/632,228, filed Jul. 31, 2003; "Memory Management Of Local Variables," Ser. No. 10/632,067, filed Jul. 31, 2003; "Memory Management Of Local Variables Upon A Change Of Context," Ser. No. 10/632,076, filed Jul. 31, 2003; "A Processor With A Split Stack," Ser. No. 10/632,079, filed Jul. 31, 2003; "Using IMPDEP2 For System Commands Related To Java Accelerator Hardware," Ser. No. 10/632,069, filed Jul. 31, 2003; "Test With Immediate And Skip Processor Instruction," Ser. No. 10/632,214, filed Jul. 31, 2003; "Test And Skip Processor Instruction Having At Least One Register Operand," Ser. No. 10/632,084, filed Jul. 31, 2003; "Synchronizing Stack Storage," Ser. No. 10/631,422, filed Jul. 31, 2003; "Methods And Apparatuses For Managing Memory," Ser. No. 10/631,252, filed Jul. 31, 2003; "Write Back Policy For Memory," Ser. No. 10/631,185, filed Jul. 31, 2003; "Methods And Apparatuses For Managing Memory," Ser. No. 10/631,205, filed Jul. 31, 2003; "Mixed Stack-Based RISC Processor," Ser. No. 10/631,308, filed Jul. 31, 2003; "Processor That Accommodates Multiple Instruction Sets And Multiple Decode Modes," Ser. No. 10/631,246, filed Jul. 31, 2003; "System To Dispatch Several Instructions On Available Hardware Resources," Ser. No. 10/631,585, filed Jul. 31, 2003; "Micro-Sequence Execution In A Processor," Ser. No. 10/632,216, filed Jul. 31, 2003; "Program Counter Adjustment Based On The Detection Of An Instruction Prefix," Ser. No. 10/632,222, filed Jul. 31, 2003; "Synchronization Of Processor States," Ser. No. 10/632,024, filed Jul. 31, 2003; "Conditional Garbage Based On Monitoring To Improve Real Time Performance," Ser. No. 10/631,195, filed Jul. 31, 2003; "Inter-Processor Control," Ser. No. 10/631,120, filed Jul. 31, 2003; "Cache Coherency In A Multi-Processor System," Ser. No. 10/632,229, filed Jul. 31, 2003; "Concurrent Task Execution In A Multi-Processor, Single Operating System Environment," Ser. No. 10/632,077, filed Jul. 31, 2003; and "A Multi-Processor Computing System Having A Java Stack Machine And A RISC-Based Processor," Ser. No. 10/631,939, filed Jul. 31, 2003.

BACKGROUND OF THE INVENTION

1. Technical Field of the Invention

The present invention relates generally to reformat logic that permits a device buffer to be accessed through a high level programming language.

2. Background Information

Many types of devices require device drivers for the operation of the device. Such devices may include displays and keyboards. A device driver is executable software that provides a programming interface between a high level programming language and the device. A device driver typically requires a portion of memory to be allocated for its use in providing data to or receiving data from the device it controls.

With regard to at least some high level languages (e.g., Java), such languages typically require a "call" to a device driver that may be written in a "native" language such as C. The high level application generally uses a data structure to provide data to, or receive data from, a corresponding data structure in the device driver memory. The two data structures may not be directly compatible and thus, a mapping between the two may be needed. Mapping a data structure from a high level language to the data structure in the device driver memory can be computationally intensive. Additionally, the calls that permit the context change between the high level application and the device driver undesirably introduce latency.

BRIEF SUMMARY

In some embodiments, reformat logic comprises a plurality of registers and translation logic that accesses the registers. The translation logic receives a memory access targeting data associated with a device (e.g., a peripheral device), whose data have a different representation format within an application program versus the targeted device. The translation logic dynamically reformats the request to a format compatible with the device based on values stored in the registers. The translation logic dynamically changes the associated address of the original data viewed by the application program to a different address corresponding to the data within the device. In the example of the application program being a Java program, the Java program may access devices in Java, instead of through a costly native method calls to device drivers.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to logic that interfaces a processor to memory to permit a peripheral device (e.g., a display) to be managed by application software running on the processor without the use of a device driver. Merely by way of example, the embodiments described herein are directed to a Java application that manages a display device, although the principles discussed herein have applicability apart from the Java language and display devices.

Figure 1:
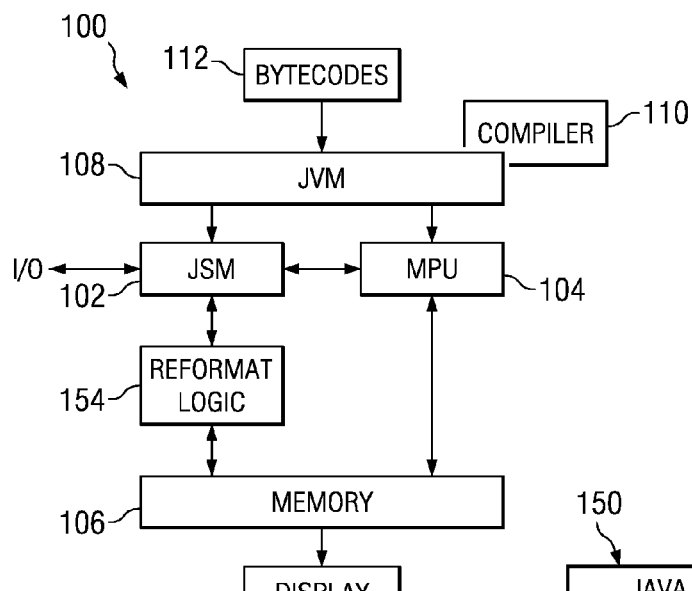
FIG. 1 shows a diagram of a system in accordance with preferred embodiments of the invention and including reformat logic to permit a processor directly manage memory associated with a hardware device.

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. Reformat logic 154 couples to the JSM 102 to the memory 106. The use of the reformat logic and associated software will be described in greater detail below.

Referring still to FIG. 1, system 100 also includes a Java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may include, without limitation, a battery and an analog transceiver to permit wireless communications with other devices. System 100 may be representative of, or adapted to, a wide variety of electronic systems, and an exemplary electronic system may comprise a battery-operated, mobile cell phone.

The Java code executed in system 100 comprises a plurality of "Bytecodes" 112. The Bytecodes 112 are provided to the JVM 108, compiled by compiler 110 and provided to the JSM 102 and/or MPU 104 for execution therein. The JVM 108 generally comprises a combination of software and hardware. The software may include the compiler 110 and the hardware may include the JSM 102. The JVM may include a class loader, bytecode verifier, garbage collector, and a bytecode interpreter loop to interpret the bytecodes that are not executed on the JSM processor 102.

Figure 2:
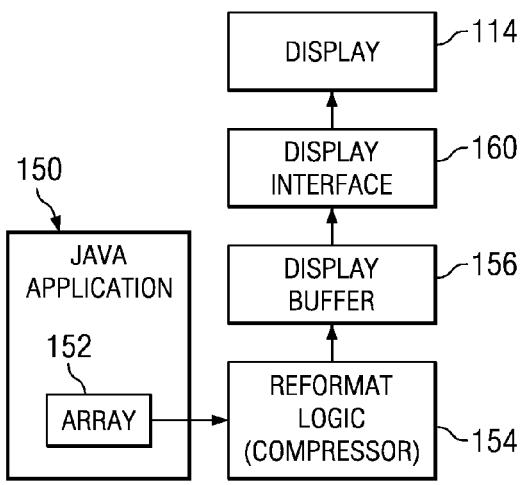
FIG. 2 further illustrates the system of FIG. 1.

FIG. 2 shows various components related to the management of the display 114. As shown, an application software 150 (e.g., Java application) includes an application data structure 152. The application data structure 152 may comprise any suitable type of structure such as an array or an object and is mapped in memory 106. In the context of a display memory buffer, the data structure fits best with a Java array. Consequently, the data structure 152 is described below as an array, but more broadly can be other types of structures. The application array 152 links to reformat logic 154 which, in turn, can access a display buffer 156. Display buffer 156 preferably comprises a portion of memory 106 allocated for use by the display 114. More specifically, information to be shown on the display 114 preferably is stored in the display buffer 156. A display interface 160 extracts display data from the display buffer 156 and provides an appropriate electrical interface to cause the desired information to be shown correctly on the display 114. This display buffer 156 also may comprise an intermediate buffer allocated for a particular Java application and managed by a global operating system ("O/S") display management symbolized here by the display interface 160 that preferably would be running on the MPU 104 and that would enable multiple applications (Java or other) to share a full screen appliance.

As noted above, the software application 150 includes an application array 152. In general, a Java application may include more than one application array, but for purposes of explaining the preferred embodiments of the invention, the software application 150 includes at least one application array 152 usable for managing the display 114.

The application array 152 preferably is a Java array and thus comports with the applicable requirements of the Java programming language. In Java, the smallest format representation for data processing is 32 bits. Consequently, in accordance with the preferred embodiment, the representation of a display in the Java application comprises an n-bit array 152, where n equals 32. The display buffer 156, however, may be formatted differently than the Java array 152. For example, while the application array 152 may be an n-bit addressable data structure, the display buffer 156 may comprise an m-bit addressable data structure where m is different than n. In some embodiments, for example, m could be 8, but m could also be any number of bits appropriate to the display color definition, while n may be 32 bits.

In accordance with a preferred embodiment of the invention, the Java application 150 accesses the display buffer 156 through application array 152 to manage the display 114 without the use of a display driver. The Java application 150 can cause text and/or graphics data ("display data") to be shown on display 114 by writing such display data to the application array 152. As noted above, the application array 152 is n-bit addressable and the display buffer is m-bit addressable, where n may be different (e.g., greater) than m. Thus, the application array is formatted differently than the display buffer. With n being different than m, the display data from the application array 152 cannot be copied directly into the display buffer 156 without being re-formatted. When the data within the application array 152 is accessed by the application software 150, the data is automatically reformatted by reformat logic 154 into a format compatible with the display buffer 156 on a write and from a display buffer format to a format compatible with the application array on a read. The m dimension of display buffer might or might not fit with the memory minimum access granularity, causing a write within the display buffer to be replaced by a read-modify-write by the reformat logic 154 when accesses to the compressed physical area do not match in size with the memory access granularity.

Because the process of reformatting the display data from the application array 152 may comprise reducing a wider n-bit wide data value to a narrower m-bit wide data value, the reformat logic 154 is referred to as a "compressor," although this disclosure and claims are not limited to compressing data per se. Further, as explained below, the compressor 154 also alters the address of the JSM's display transaction to comport with a valid address associated with the display buffer 156.

Figure 3:
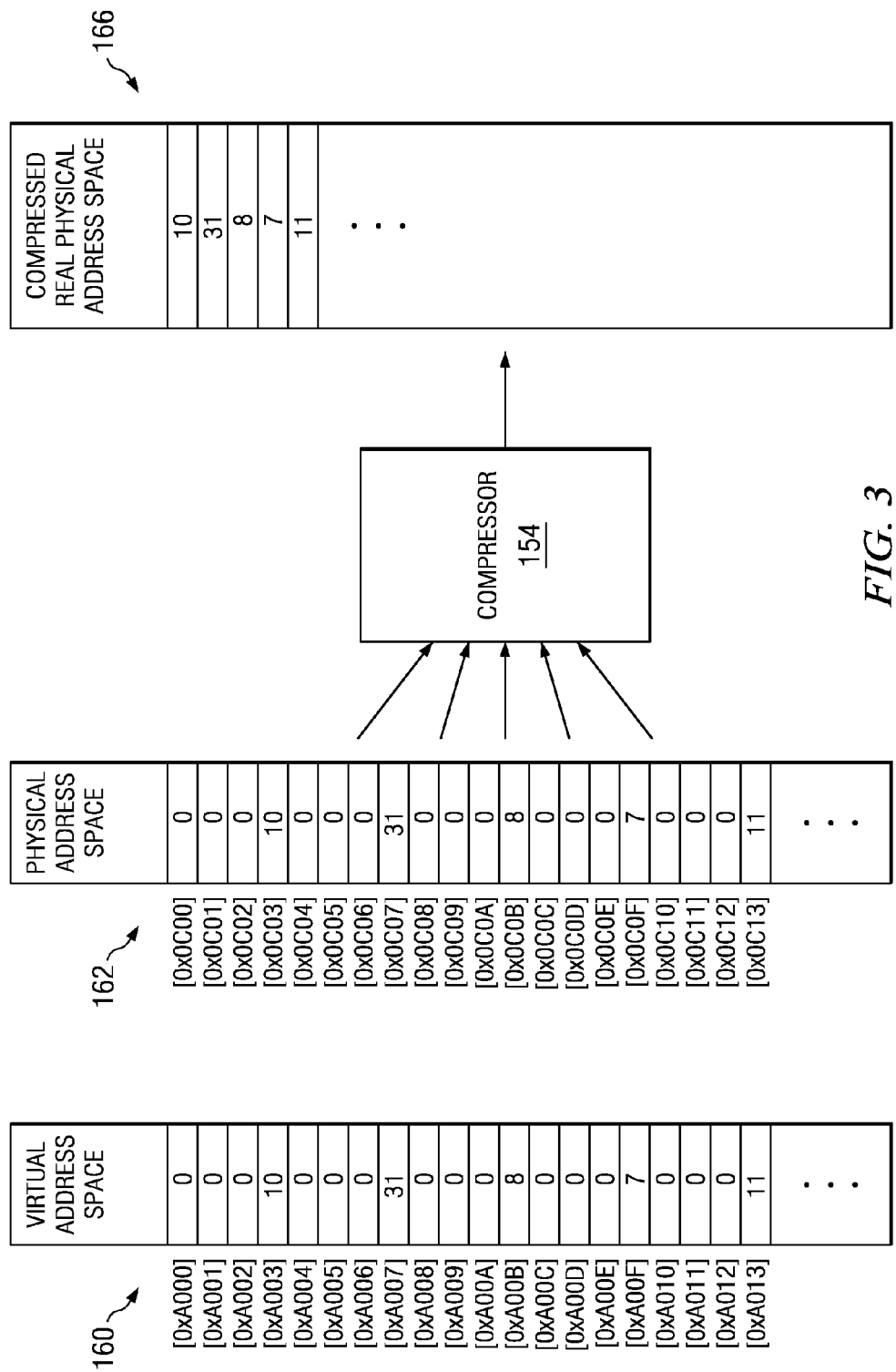
FIG. 3 illustrates the operation of the compressor to permit an application to manage the memory of the hardware device.

FIG. 3 further illustrates the functionality of the compressor 154. Virtual address space 160 associated with application array 152 includes display data from application 150 to be written to a compressed, real physical address space 166 that is stored in display buffer 156. In the example of FIG. 3, the virtual memory space 160 has a starting address of 0xA000 and is shown as being mapped onto a physical address space 162 that starts at address 0xC000. In the preferred embodiment, some or all of the physical address space 162 does not exist because the targeted real memory is the compressed memory space 166.

To enable the compression, the compressor 154 preferably maps the high level representation (32-bit-based memory block) in virtual address space 160 on to a low level representation (8-bit-based memory block) in compressed address space 166. The data content of the virtual address space 160 preferably does not exceed the low-level representation maximum value. For example, if the compressed address space 166 is 8-bits wide, then the virtual address space 160 associated with the application array 152 stores meaningful data in chunks of eight bits. As shown in FIG. 3, meaningful data chunks are shown at addresses 0xA003, 0xA007, 0xA00B, and so on, with the remaining portions of the address space (e.g., 0xA000-0xA003, 0xA004-0xA006, and so on) are set to a predetermined value of 0. Other embodiments may compress the value of the data by truncating the least significant bits of the data or any other processing on the data such as filtering.

As discussed above, the preferred embodiments of the invention include the use of a Java application array 152 to be used as the Java representation of the device's memory mapped memory. An exemplary Java method is shown below in which the application array 152 is the array labeled "VGA." ("Video Graphics Adapter").

```
Class DisplayBitmap
{
    public int VGA [320×200];
    DisplayBit ( )
    {
        //mapping the array on the device driver
        mapArrayOn(VGA, 0xC000)
    }
    void driverSetPixel(int X, int Y, int value)
    {
        VGA[X+Y*320] = value;
    }
    ...
    ...
}
```

To fully implement the mapping, an application programming interface ("API") is implemented that makes first a mapping of the base of the array on an address. The method "mapArrayOn" is called the "constructor" of the object DisplayBitmap. The Java array VGA is first mapped on to the display buffer at address 0xC000, which corresponds to the area that is going to be compressed in the real compressed physical area 166 during an initialization phase of the Java program or before the Java program uses the display to output data. Other methods provide means to output or retrieve data from the display. The Java code "DriverSetPixel" method shown above may write a value of a pixel at a location X, Y in the display buffer using the instruction implementing "VGA [X+Y*320]=value" which may correspond to an "iastore" Java bytecode.

Figure 4:
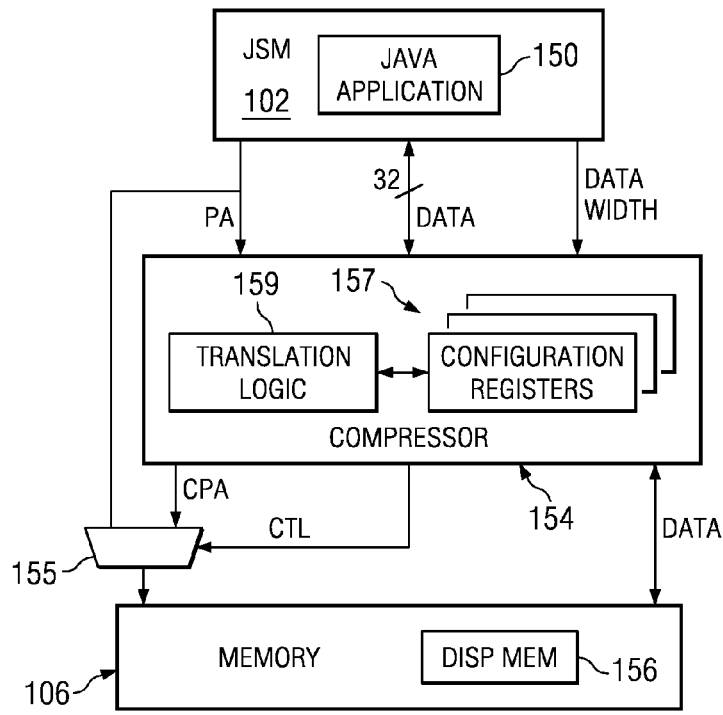
FIG. 4 further illustrates the operation of the reformat logic.

Referring now to FIG. 4, various components of the system 100 are shown including the JSM 102, compressor 154, and memory 106. As shown, the JSM 102 executes the Java application 150. The compressor 154 preferably includes a plurality of programmable registers 157 and translation logic 159 that is coupled to the registers 157 or otherwise is capable of accessing the contents of the registers. As described below, the registers 157 are programmed with various values pertaining to the mapping between the application array 152 and the display buffer 156. As depicted in FIG. 4 for a write transaction, the translation logic 159 uses the values stored in the registers 157 to convert a physical address ("PA"), such as a physical address 162 (FIG. 3) from the JSM 102 to a compressed physical address ("CPA") corresponding to the display buffer 156. Conversely, for a read transaction from buffer 156, the PA from the JSM 102 corresponding to the read address is converted by translation logic 159 to an appropriate CPA address so that the requested read data can be returned through the compressor 154 to the JSM 102. The compressor 154 also may convert the data itself between the formats corresponding to the application array 152 and the display buffer 156. The conversions of the target addresses and the data preferably are performed by the translation logic 159 using values (explained below) stored in the compressor's configuration registers 157.

The system shown in FIG. 4 also includes a multiplexer 155. The multiplexer 155 receives address inputs from the JSM 102 and the compressor 154. A control signal (CTL) from the compressor controls which of the inputs are provided as the output of the multiplexer 155 to the memory 106. As shown, the multiplexer 155 selectively permits accesses from the application 150 to be provided to the memory 106 without being reformatted by the compressor 154 and permits accesses from the application to be reformatted by the compressor 154 before being provided to the memory 106. In other embodiments, the signal controlling the multiplexer 155 may come from processor 102 along with the address removing the detection functionality from the compressor 154. The detection functionality indicates whether an address coming from the processor core belongs to the area that needs to be compressed.

Figure 5B:
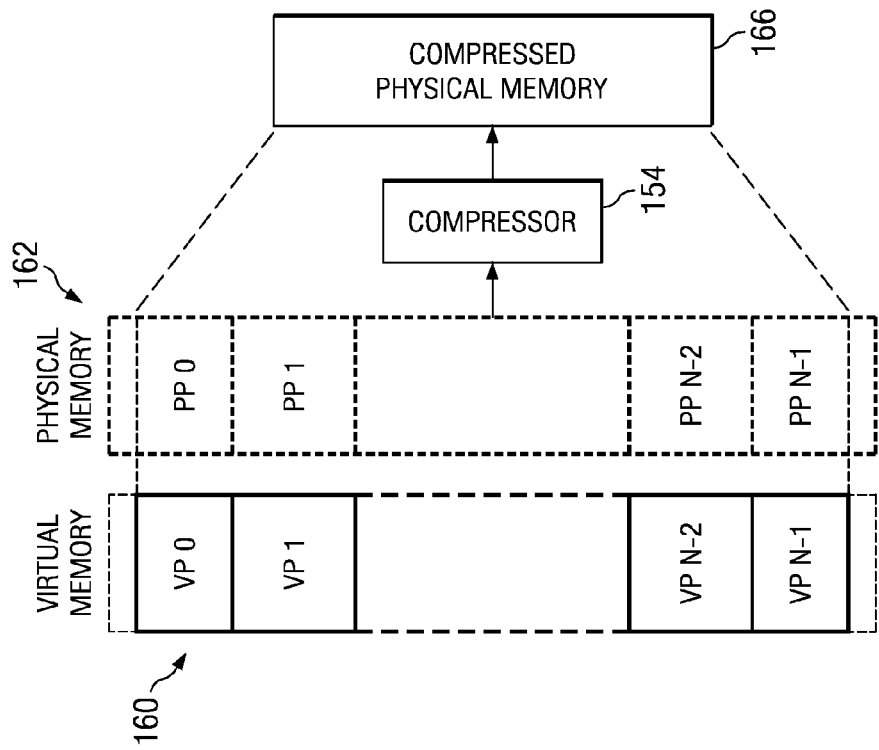
FIGS. 5A and 5B show various embodiments illustrating constraints on the system.
Figure 5A:
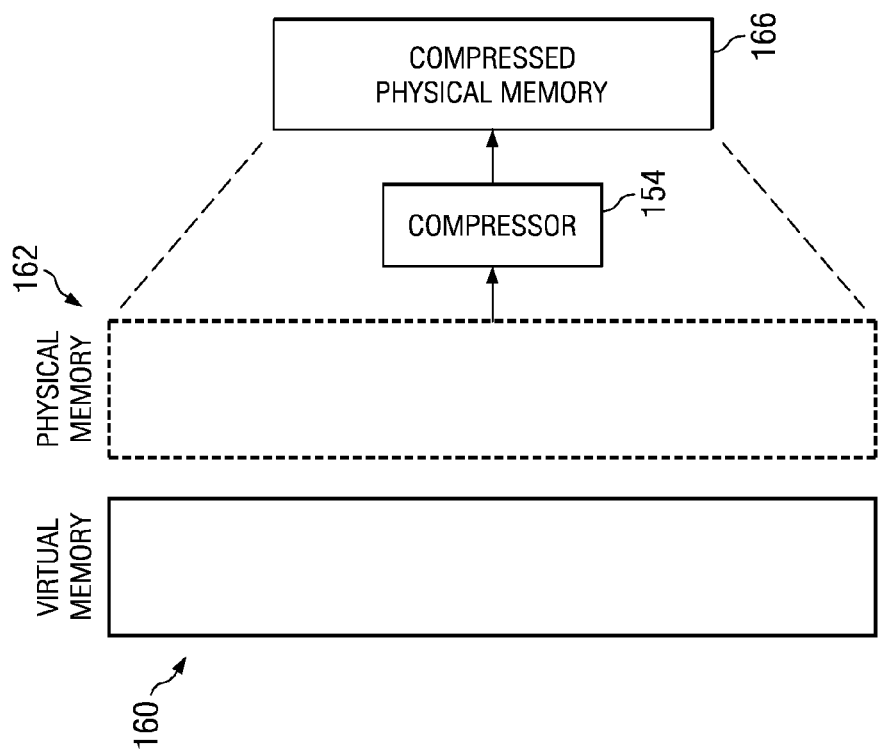

FIGS. 5A and 5B illustrate various constraints that may be applicable to the use of the compressor 154. In FIG. 5A, if the operating system running on the MPU 104 (FIG. 1) uses a flat (or linear) addressing mode or segmentation mode, the virtual memory space 160 associated with the application array 152 preferably comprises a contiguous virtual memory range. The contiguous virtual memory range 160 is viewed as being mapped on physical memory 162, which itself is translated to compressed physical memory 166.

In FIG. 5B, if the operating system uses page-mode addressing, the virtual memory space 160 is divided into a plurality of individual virtual pages (VP 0, VP 1, . . . , VP N−1). In accordance with the operation of the compressor 154, the virtual memory space 160 for page-mode addressing comprises a contiguous virtual memory range as shown. The physical mapping of the virtual space pages is viewed as mapping the pages on to physical memory space 162, where physical pages PP 0 to PP N−1 are contiguous. The pages, in fact, are compressed on to compressed physical memory 166

(display buffer). In general, no constraints are placed on the starting address of the compressed physical memory space 166.

As explained above, the compressor 154 includes multiple registers that hold one or more programmable values to translate a physical address into another compressed physical address. The programmable values preferably are under the control of the JVM 108 and comprise, or are otherwise indicative or representative of, the starting address of the non-compressed memory area containing the physical addresses to convert (SAPB), the end address of the non-compressed area (EAPB) or its overall size, the starting address of the compressed target display buffer 156 (SAPCB), the number of bits ("n") per element in the array in the application software and the number of bits ("m") per element in the display buffer or the ratio m/n. The address calculation resulting from reformatting the data typically will be equivalent to CPA=SAPCB+(SAPB-PA)*m/n. Other information such as the memory granularity access (e.g., 8 bits, 16 bits, 32 bits) may be included to manage unaligned write accesses. The compressor 154 facilitates the JVM 108 to efficiently access device memory mapped memories.

Figure 6A:
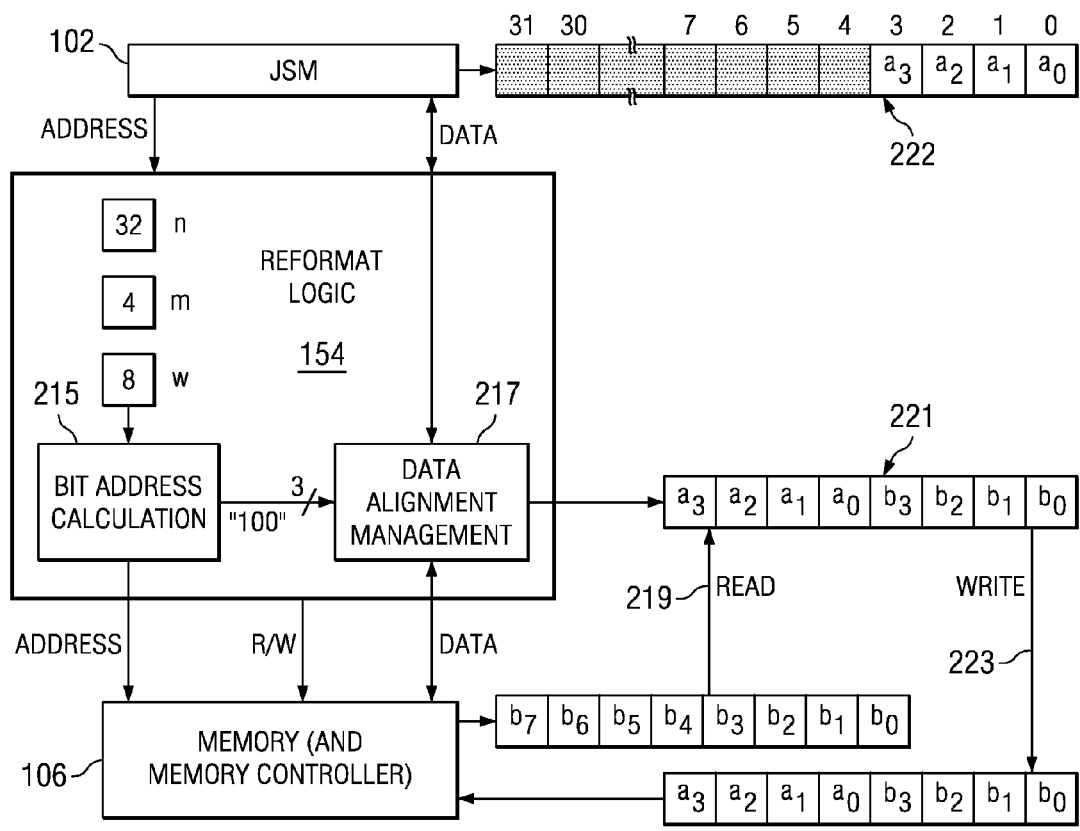
FIGS. 6A and 6B illustrate the operation of the reformat logic under data alignment and non-alignment conditions.
Figure 6B:
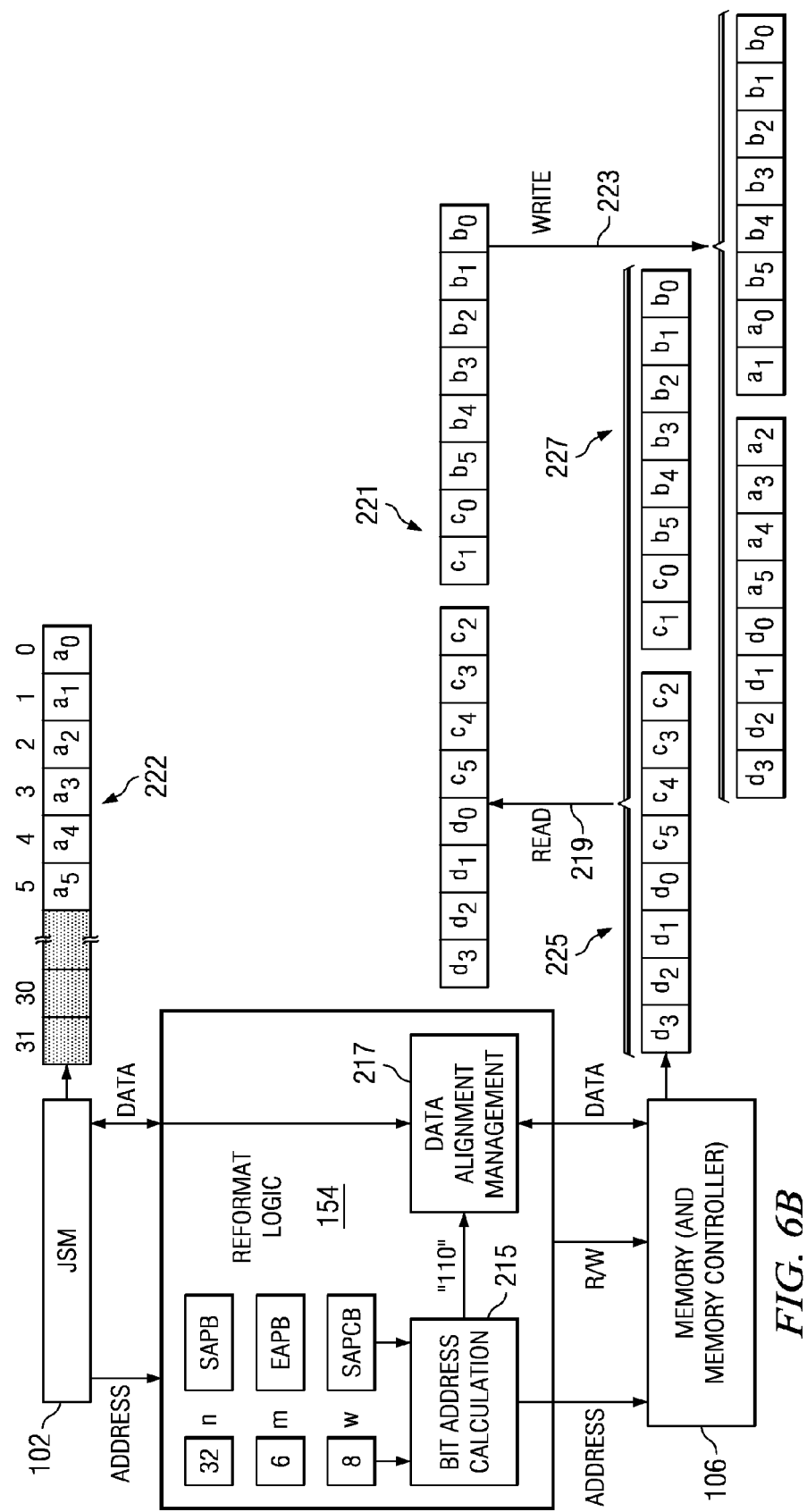

FIGS. 6A and 6B illustrate the operation of the reformat logic in various situations. Referring first to FIG. 6A, the reformat logic 154 is illustrated as operating in the situation in which n is 32, m is 4 and w is 8, where n and m are defined above and w represents the memory 106 access granularity. In this example, the application running on the JSM 102 comprises a Java application in which accesses are 32 bit accesses, but memory accesses to memory 106 are single byte accesses. Further, each element in the device buffer comprises a 4-bit value (a "nibble"). In this example, the accessible elements in the device buffer are "aligned" with the width of the memory 106. As such, each 4-bit nibble is accessible within a single byte from memory 106. Alternatively stated, a single 4-bit nibble does not span across byte boundaries.

The reformat logic 154 preferably includes bit address calculation 215 and data alignment management 217 which may be implemented as part of the translation logic 159 (FIG. 4). The values of n, m and w may be stored into one or more of the registers 157 and are provided to the bit address calculation 215 for calculation of the address that is provided to memory 106 (which comprises a memory controller in addition to random access memory). The bit address calculation 215 determines whether the target 4-bit nibble is in the lower four bits or upper four bits of an addressable byte in the memory 106. In the example of FIG. 6A, the target 4-bit nibble is the upper four bits of a byte beginning at bit position 4. As such, the bit address calculation 215 provides the 3-bit index "100" (binary for "4") to the data alignment management 217.

Because a write from the JSM 102 targets 4-bit nibbles in a byte addressable buffer, a "read-modify-write" operation is implemented to read the target byte, modify the relevant 4-bit nibble and write the modified back to memory. This operation is illustrated beginning at 219 in which the initial byte read is performed based on an address computed by the bit address calculation 215. The byte read from memory comprises the 8-bits $b_7 \ldots b_0$. This value is read by the reformat logic 154 and loaded into the data alignment management logic 217. At 221, the upper four bits of the byte (i.e., the target nibble) are replaced by the four bits $a_3 \ldots a_0$ from the initial 32 bit value from the JSM at 222. After modifying the byte, the modified byte is written back to memory by the reformat logic 154 as shown at 223.

FIG. 6B illustrates the situation in which the number of bits for each display element (m) is not an integer multiple of the n. This is an example of a "non-alignment" condition. In the example of FIG. 6B, m is 6 and thus, any one 6-bit display value may span more than one byte in memory 106. In the example of FIG. 6B, the JSM 102 is attempting to write the 6-bit value $a_5 \ldots a_0$ to the display buffer. The target 6-bit value in memory corresponds to the value of $c_5 \ldots c_0$ which spans across bytes 225 and 227. The bit address calculation unit 215 calculates the addresses corresponding to byte bytes 225 and 227 and initiates a read 219 of both bytes to load the bytes into the data alignment management unit 217. The addresses are calculated based on the values of n, m, w, SAPB, EAPB, and SAPCB. The bit address calculation logic 215 determines that the target 6-bit value begins at bit position 6 in byte 227 and thus generates and provides a three bit value of "110" (binary equivalent of 6) to the data alignment management 217. The data alignment management 217 uses the data from the JSM 102 and the value 110 from the bit address calculation unit 215 to modify bytes 225 and 227 to replace at 221 the upper two bits of byte 227 and the first four bits of byte 225 with the desired value $a_5 \ldots a_0$. At 223, the modified bytes are written back to memory.

FIG. 6 illustrates how Java "metadata" is treated in a preferred embodiment in which the application array 152 is a single dimension array. Each object in Java includes metadata that may be used to manage the object. The metadata may include information such as object type, object size, and other object-specific parameters. As shown, an application array 152 comprises a data structure 168 that includes a "head" metadata 170, a tail metadata 174, and object fields 172. The head metadata 170 precedes the object fields 174 and the tail metadata 174 may follow the object fields 172. In the preferred embodiments, the metadata fields 170 and 174 are not compressed by compressor 154. That is, the compressor 154 preferably compresses the object fields 172, but not head and tail metadata fields 170 and 174.

Figure 7:
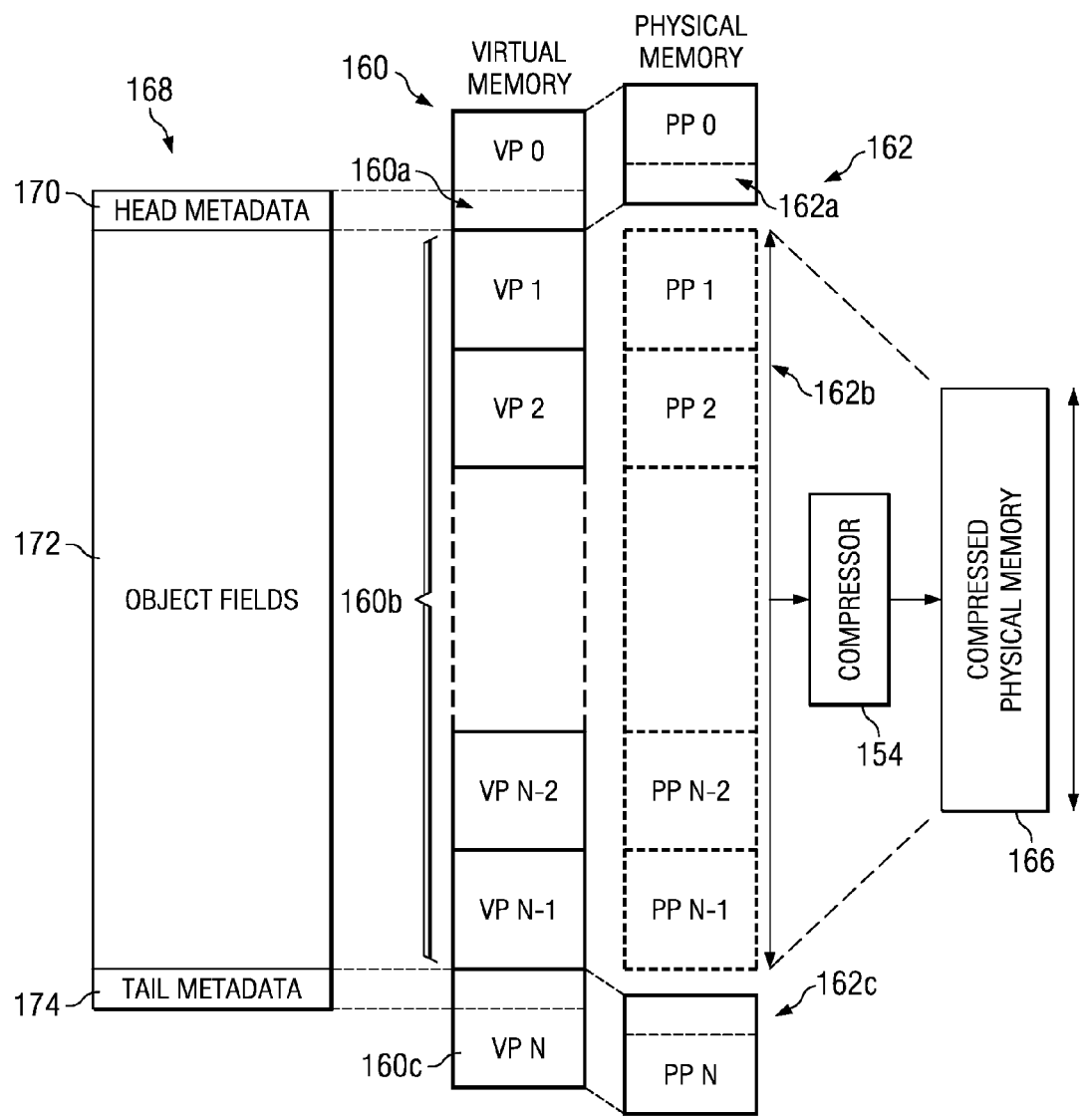
FIG. 7 illustrates the use of the system when the application software operates on objects that include metadata.

Referring still to FIG. 7, if a flat or a segment addressing mode is implemented by the operating system and if head and/or tail metadata exists as in FIG. 7, the memory preceding (162*a*) and following (162*c*) the physical memory 162*b* that is compressed into physical memory 166 preferably exists for the process described herein to work in accordance with at least some embodiments while the physical address 162*b* may not exist.

In page mode addressing, head or tail metadata may be mapped onto separate pages 160*a* (VP 0), 160*c* (VP N) in the virtual address space 160. As such, head metadata 170, object fields 172, and tail metadata 174 are stored in contiguous virtual address blocks as shown in FIG. 7 while in the physical space, they may be mapped onto areas that are compressed (162*b*) and not compressed (162*a*, 162*c*). For this configuration, the frontier of the beginning and the ending of the compressible memory space preferably is page aligned. Some embodiment may have only metadata within a header.

Figure 8:
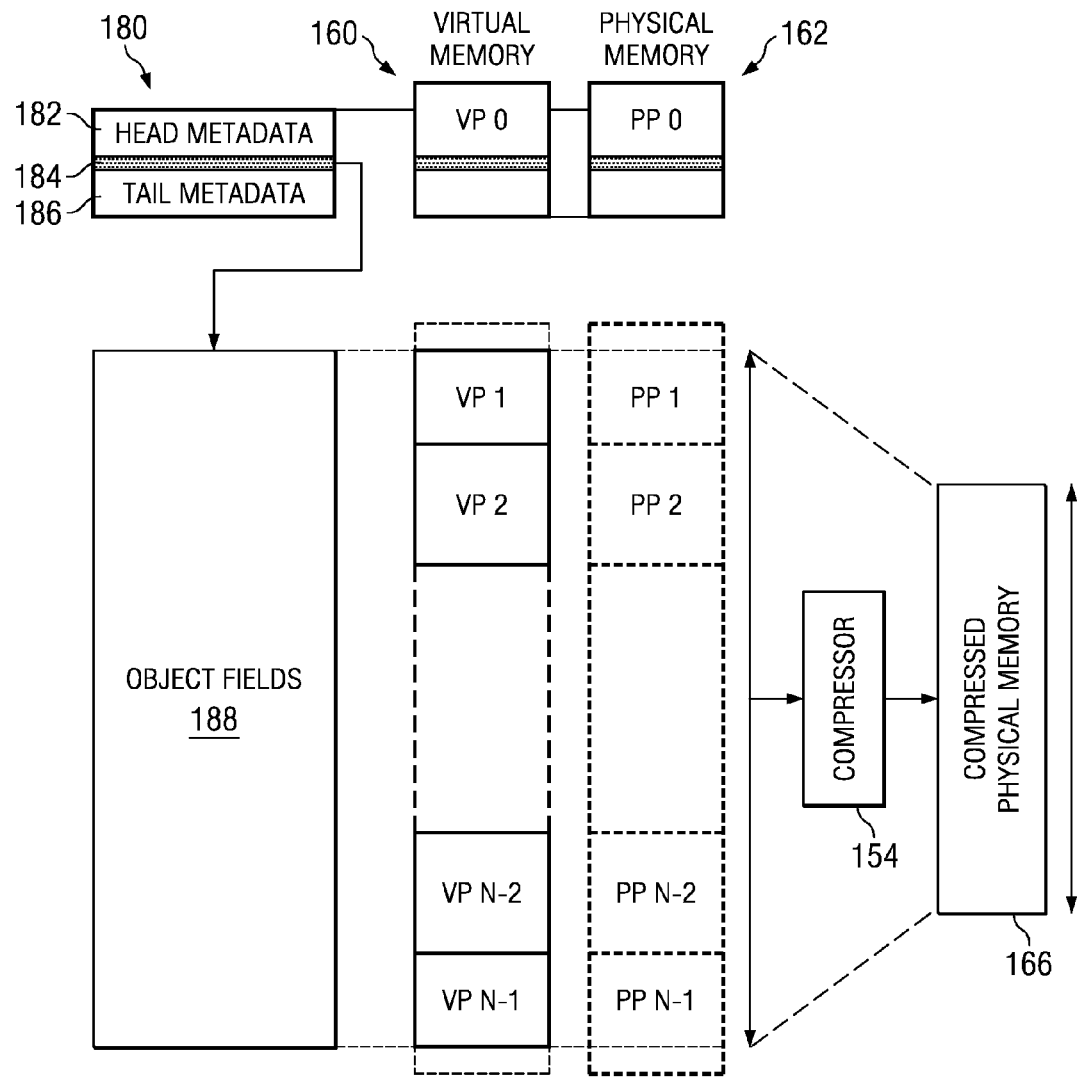
FIG. 8 illustrates the operation of the system operating on non-contiguous data structures.

Referring now to FIG. 8, another embodiment is shown with a non-contiguous object configuration of a single dimension array. Head metadata 182, pointer field 184, and tail metadata 186 preferably are contiguous in memory. The pointer field 184 includes a reference to an area that may comprise a pointer value that refers to object fields 188. A systematic indirection is used to access the object fields using the pointer 184.

Figure 9:
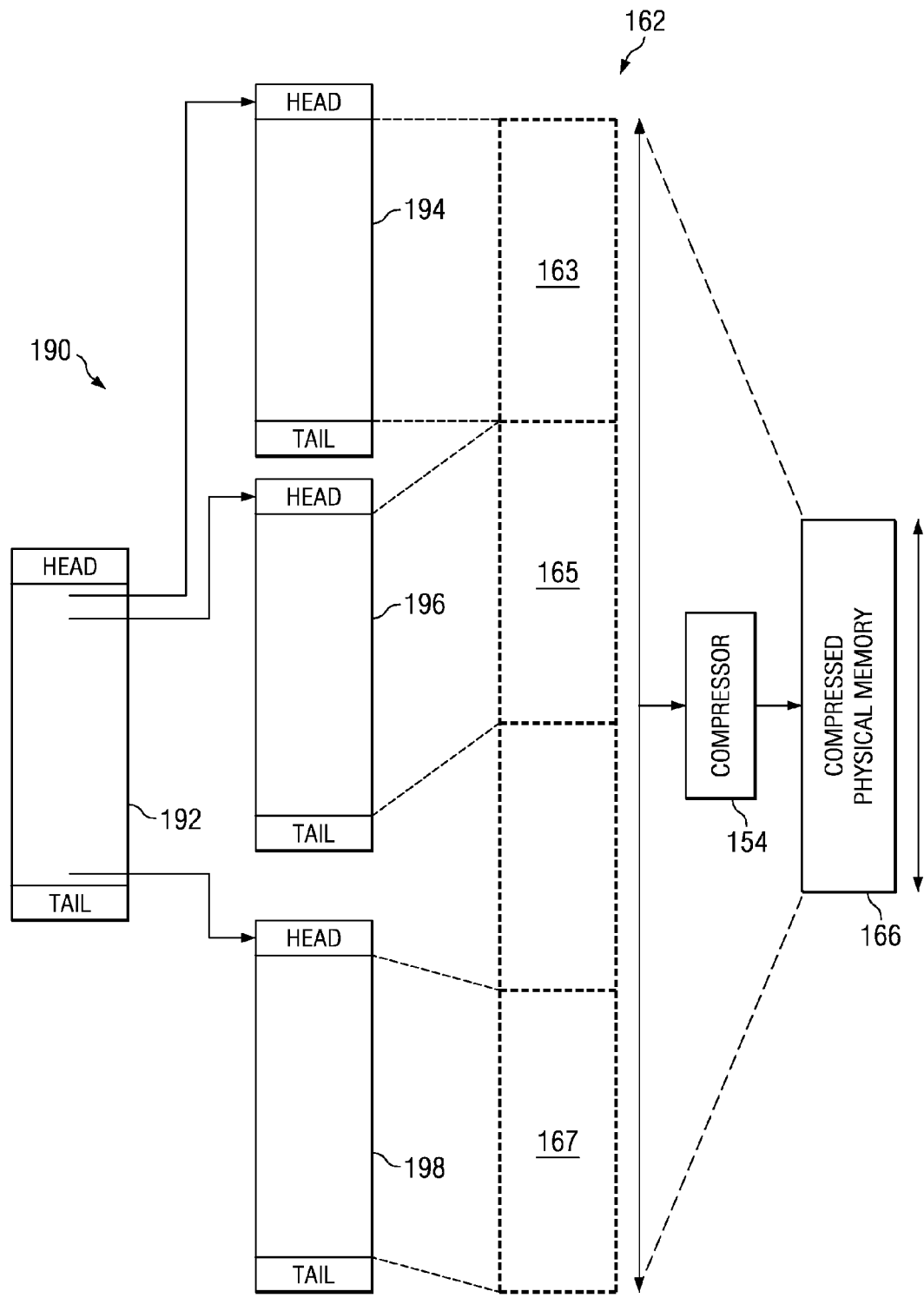
FIGS. 9 and 10 illustrate various embodiments of the system operating on multi-dimensional data structures.

Java permits the creation and use of multi-dimensional arrays. FIG. 9 depicts the use of application array 152 storing a multi-dimensional data structure 190. Virtual addressable blocks 192 comprise one dimension of the multi-dimensional data structure 190 and the second dimension comprises virtual addressable blocks 194, 196 and 198 as shown. Block 192 comprises pointers to blocks 194, 196 and 198. According to mapping constraints, in flat, segment or page-based addressing, all object fields representing the last dimension of the array (blocks 163, 165, and 167) are physically mapped on to contiguous compressed physical memory 166.

Figure 10:
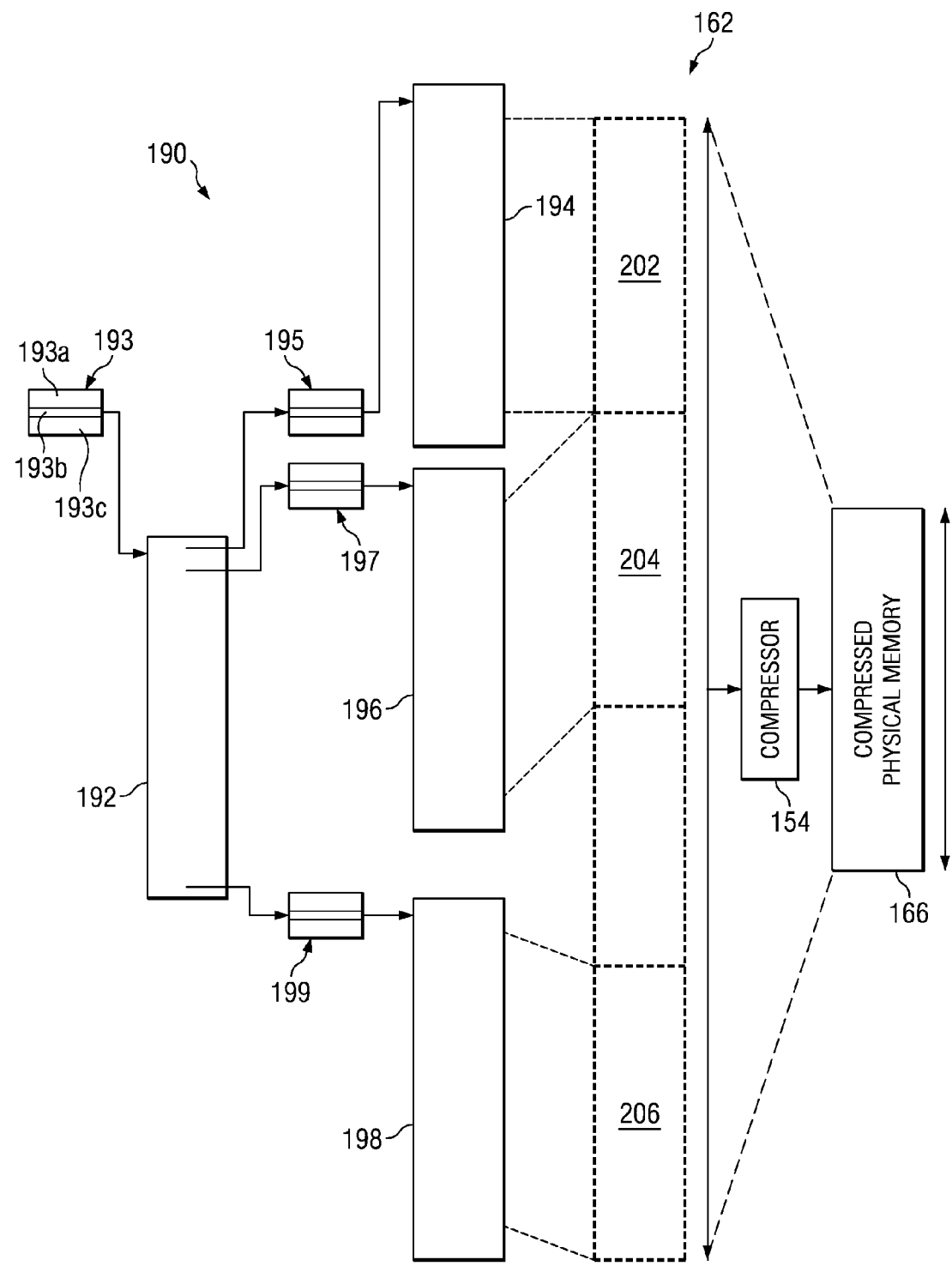

FIG. 10 represents a non-contiguous (as in FIG. 8) two-dimensional array 190 with one dimension comprising block 192 and the other dimension comprising blocks 194, 196, and 198. In this configuration of FIG. 10, all object fields representing the last dimension of the array (blocks 202, 204, and 206 are physically mapped on to compressed physical memory 166 (display buffer) that is contiguous.

The preferred embodiments of the invention provide substantial benefits over other device management paradigms. For example, a high level language typically requires the use of calls to a display driver to cause information to be shown on a display. In the preferred embodiments, the MPU 104 need not be interrupted to run a native device driver. In some Java implementations on a single processor with a software JVM, the processor needs to switch its context from a JVM execution to the display driver execution. The context switch is performed through the execution of a native method through the standard Java Native interface ("JNI"). There are no function calls or interrupt service handlers to be used in the preferred embodiment and thus, there is no switch from Java to a native method through JNI. As a result, latency is reduced. Further, the calculation to translate the address used within the application to the corresponding address used within the display buffer is performed by hardware rather than software, thereby freeing processor resources for other tasks.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A system, comprising:
  a processor executing an application;
  a peripheral device coupled to the processor;
  memory containing an application data structure accessible by said application, wherein accesses to said application data structure and accesses to said device are formatted differently, and wherein data can be written to, or read from, the peripheral device via the application data structure; and
  reformat logic coupled to the processor and memory, the reformat logic dynamically reformats an access from the application targeting the application data structure to a format that comports with the device, thereby permitting said application to manage the peripheral device without the use of a device driver, wherein the reformat logic includes alignment logic that implements a read-modify-write operation to write a value from the application data structure across byte boundaries in a display buffer.

2. The system of claim 1 wherein the peripheral device comprises a display.

3. The system of claim 1 wherein the application data structure comprises an array.

4. The system of claim 3 wherein the array comprises a multi-dimensional array.

5. The system of claim 3 wherein array comprises a single-dimensional array.

6. The system of claim 1 further including a device buffer associated with the device and wherein the application data structure comprises an n-bit data structure and the device buffer comprises an m-bit display buffer, wherein n is different than m, and the reformat logic reformats an n-bit access from the application to an m-bit access for the device buffer.

7. The system of claim 6 wherein n is not an integer multiple of m.

8. The system of claim 6 wherein m is less than n.

9. The system of claim 6 wherein the reformat logic comprises a plurality of registers which are programmable to store a plurality of values, said values comprising information that is indicative of the starting and ending addresses of the application data structure in which accesses are to be reformatted by the reformat logic, the starting address of the device buffer, n, and m.

10. The system of claim 6 wherein the reformat logic comprises a plurality of registers which are programmable to store a plurality of values, said values comprising information that is indicative of the starting and ending addresses of the application data structure in which accesses are to be reformatted by the reformat logic, the starting address of the device buffer, n, and value indicative of the ratio between n and m.

11. The system of claim 6 wherein the registers are programmed by a virtual machine.

12. The system of claim 1 further comprising a multiplexer that selectively permits accesses from the application to be provided to bypass the reformat logic so that such accesses are not reformatted by the reformat logic and permits accesses from the application to be reformatted before being provided to the memory.

13. The system of claim 12 wherein the reformat logic controls the multiplexer to select whether or not a reformatted access is to be provided to the memory.

14. The system of claim 12 wherein the processor supplies an address to the multiplexer and to the reformat logic and asserts a signal to the multiplexer to cause the multiplexer to select whether or not a reformatted access is to be provided to the memory.

15. Reformat logic, comprising:
  a plurality of registers; and
  translation logic that accesses the registers and that receives a memory access targeting an application data structure that has a different format than for accesses that are provided to a device that is external to said reformat logic and that reformats the request to a format compatible with the device based on values stored in the registers, wherein the translation logic implements a read-modify-write operation to write a value from the application data structure across byte boundaries of a memory buffer associated with said device.

16. The reformat logic of claim 15 wherein the application data structure is n-bit accessible and the memory buffer is m-bit accessible where m is less than n, and the translation logic reformats the request from an n-bit format to an m-bit format.

17. The reformat logic of claim 16 wherein n is not an integer multiple of m and the reformat logic includes alignment logic to implement the read-modify-write operation.

18. The reformat logic of claim 16 further comprising a plurality of registers which are configured to be programmed to store a plurality of values, said values comprising values that enable to determine the starting and ending addresses of the application data structure in which accesses are to be reformatted by the reformat logic, the starting address of the memory buffer, n, and m.

19. The reformat logic of claim 16 further comprising a plurality of registers which are configured to be programmed to store a plurality of values, said values comprising values that enable to determine the starting and ending addresses of the application data structure in which accesses are to be reformatted by the reformat logic, the starting address of the memory buffer, n, and value indicative of the ratio between n and m.

20. The reformat logic of claim 15 wherein the translation logic reformats both read and write requests.

21. The reformat logic of claim 15 wherein the memory buffer for which the reformat logic reformats a request comprises a display memory buffer associated with a display.

22. A method, comprising:
receiving a physical address from a processor, the physical address associated with an application data structure;
converting the physical address to a device buffer address associated with a device buffer, the device buffer being accessed with a different number of bits than the application data structure;
providing the converted device buffer address to the device buffer to permit the processor to control a peripheral device without using a driver associated with the peripheral device; and
performing a read-modify-write operation to write a value from the application data structure to the device buffer across byte boundaries of the device buffer.

23. The method of claim 22 wherein receiving the physical address from the processor is performed upon writing to the application data structure.

24. The method of claim 22 wherein receiving the physical address from the processor is performed upon reading from the application data structure.

25. The method of claim 22 further including completing a read or write transaction to the device buffer using the converted device buffer address.

26. The method of claim 22 wherein the device buffer is accessed with fewer bits than the application data structure.

* * * * *